United States Patent
Koh et al.

(10) Patent No.: US 9,695,052 B2
(45) Date of Patent: Jul. 4, 2017

(54) RECOVERY OF HYDROHALOSILANES FROM REACTION RESIDUES

(71) Applicant: REC Silicon Inc, Moses Lake, WA (US)

(72) Inventors: Pei Yoong Koh, Moses Lake, WA (US); Anthony D. Thompson, Moses Lake, WA (US)

(73) Assignee: REC Silicon Inc, Moses Lake, WA (US)

( * ) Notice: Subject to any disclaimer, the term of this patent is extended or adjusted under 35 U.S.C. 154(b) by 334 days.

(21) Appl. No.: 14/321,700

(22) Filed: Jul. 1, 2014

(65) Prior Publication Data
US 2016/0002053 A1  Jan. 7, 2016

(51) Int. Cl.
*C01B 33/107* (2006.01)

(52) U.S. Cl.
CPC .............. *C01B 33/10778* (2013.01)

(58) Field of Classification Search
CPC ................................ C01B 33/10778
USPC ................................ 423/341, 342
See application file for complete search history.

(56) References Cited

U.S. PATENT DOCUMENTS

| | | | |
|---|---|---|---|
| 3,428,530 A | 2/1969 | Fauche et al. | |
| 4,340,574 A * | 7/1982 | Coleman | C01B 33/029 203/4 |
| 5,182,095 A | 1/1993 | Ruff et al. | |
| 5,246,682 A | 9/1993 | Ruff et al. | |
| 8,119,086 B2 | 2/2012 | Stepp et al. | |
| 2006/0183958 A1* | 8/2006 | Breneman | A62D 3/33 588/313 |
| 2007/0231236 A1 | 10/2007 | Kajimoto et al. | |
| 2011/0150739 A1* | 6/2011 | Seliger | C01B 33/03 423/341 |
| 2011/0268641 A1* | 11/2011 | Brinson | C07F 7/128 423/342 |
| 2012/0100057 A1 | 4/2012 | Step | |
| 2013/0052118 A1 | 2/2013 | Fahrenbruck et al. | |
| 2013/0323151 A1* | 12/2013 | Mueh | B01J 31/0274 423/342 |
| 2014/0076709 A1 | 3/2014 | Lee et al. | |

FOREIGN PATENT DOCUMENTS

| | | |
|---|---|---|
| DE | 4116925 A1 | 11/1992 |
| JP | 2001261324 A | 9/2001 |

OTHER PUBLICATIONS

International Search Report and Written Opinion for corresponding PCT Application No. PCT/US2014/046979, dated Mar. 31, 2015.
"Drying Technology," Buss-SMS-Canzler, 16 pages, 2012.
Thin-film Drying, LCI Corporation, 2 pages, 2007.

* cited by examiner

*Primary Examiner* — Ngoc-Yen Nguyen
(74) *Attorney, Agent, or Firm* — Klarquist Sparkman, LLP

(57) ABSTRACT

Methods of recovering hydrohalosilanes from reaction residues are disclosed. An inorganic halosilane slurry comprising (i) tetrahalosilane, trihalosilane, dihalosilane, or any combination thereof, (ii) silicon particles, and (iii) heavies is passed through a thin-film dryer to remove halosilanes and form a solid residue comprising silicon particles. Heavies also may be removed as the slurry passes through the thin-film dryer.

20 Claims, 2 Drawing Sheets

RECOVERY OF HYDROHALOSILANES FROM REACTION RESIDUES

FIELD

This invention concerns recovering inorganic halosilanes from spent reaction residues.

BACKGROUND

In the manufacture of halosilanes, and notably trihalosilane, through the hydrohalogenation of metallurgical grade silicon or through hydrogenation of tetrahalosilane in the presence of hydrogen and metallurgical grade silicon, a resulting process stream can include a slurry. The slurry typically comprises the desired halosilanes accompanied by unreacted silicon particles and other polyhalosilane/polyhalooxysilane products (e.g., $Si_2X_6$, $Si_2OX_6$, where X=F, Cl, Br, or I), and metal halides (e.g., $AlX_3$). It is desirable to recover the liquids from the slurry, thereby producing a solid, high-chloride residue. The solid residue can be further processed to reclaim the chloride value with minimal loss of higher value hydrochlorosilanes (see, e.g., U.S. 2006/0183958A).

A batch dryer is effective to remove halosilanes from the slurry, but it has disadvantages. For example, it may take in excess of 10 hours due to inadequate heating capacity and/or the presence of heavies (e.g., polyhalosilanes, polyhalooxysilanes, metal halides), which have high boiling points relative to tetrahalosilane ($SiX_4$). In some cases, the boiling point is 100° C. higher than the boiling point of $SiX_4$. Additionally, abrasive solids in the slurry cause erosion on the dryer walls. The batch dryer typically requires replacement several times during the lifetime of a halosilane unit, such as every 4-5 years, due to extensive wear and tear. Thus, a need exists for a better process to separate the slurry liquids and solids.

SUMMARY

A process for recovery of hydrohalosilanes from reaction residues is disclosed. The process comprises drying an inorganic halosilane slurry produced during the manufacture of halosilanes. The process includes flowing an inorganic halosilane slurry comprising (i) volatile halosilanes (tetrahalosilane, trihalosilane, dihalosilane, or any combination thereof), (ii) silicon particles, and (iii) heavies (e.g., high-boiling oligomeric or polymeric silicon-based species and/or metal halides) through a vaporization zone of a thin-film dryer to vaporize the volatile halosilanes, the vaporization zone having an internal pressure at or above atmospheric pressure and an internal temperature $T_1$ greater than an upper end of a boiling point range of the volatile halosilanes at the internal pressure; recovering vaporized volatile halosilanes from the vaporization zone; and recovering a solid residue comprising the silicon particles and, depending on operating conditions, higher-boiling compounds (heavies) from an outlet of the thin-film dryer. The higher boiling compounds may include metal halides, polyhalosilanes, polyhalooxysilanes, and combinations thereof. Suitable thin-film dryers include a rotor within the vaporization zone, the rotor having a plurality of blades extending toward an internal wall surface of the thin-film dryer. Advantageously, $T_1$ may be less than an upper end of a boiling point or sublimation point range of the heavies, and the product further comprises at least a portion of the heavies. In certain examples, vapor recovered from the vaporization zone is substantially devoid of heavies.

In some embodiments, the thin-film dryer further comprises a second vaporization zone positioned between the vaporization zone and the outlet and having an internal temperature $T_2$, where $T_2 > T_1$, and the process further comprises flowing the slurry sequentially through the first and second vaporization zones. When $T_2$ is greater than a boiling point or sublimation point of at least one species of the heavies at the internal pressure, the process further includes vaporizing at least a portion of the heavies in the second vaporization zone to produce a heavies vapor, and recovering the heavies vapor.

Recovered vapors may include entrained fines. In some embodiments, the recovered vapor is treated to separate the entrained fines from the volatile halosilanes. The solid residue recovered from the thin-film dryer may be reactive when exposed to ambient atmosphere. In some embodiments, the solid residue is treated to produce a solid material that is non-reactive when exposed to ambient atmosphere. For example, the solid residue may be contacted with an alkaline hydrate to yield a stable, neutral solid.

The foregoing and other features and advantages of the invention will become more apparent from the following detailed description, which proceeds with reference to the accompanying figures.

DETAILED DESCRIPTION

Figure 1:
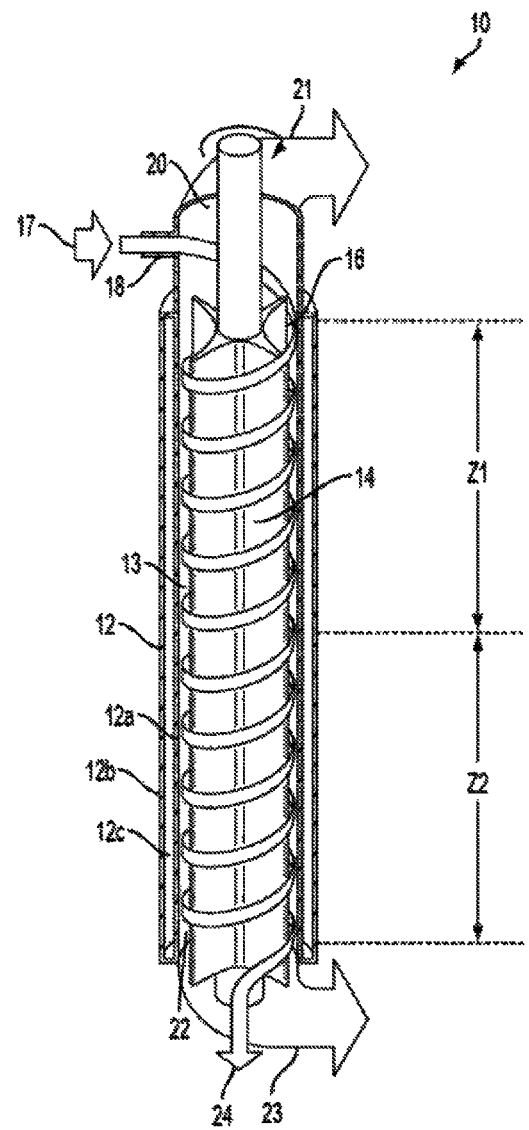
FIG. 1 is a schematic diagram of one embodiment of a vertical thin-film dryer.

Methods and apparatus for drying an inorganic halosilane slurry are disclosed. The slurry typically comprises halosilanes, heavies (e.g., polyhalosilanes/polyhalooxysilanes such as $Si_2X_6$ or $Si_2OX_6$, and/or metal halides such as $AlX_3$), entrained metal particles, and/or silicon particles. In some embodiments, the slurry is an inorganic chlorosilane slurry. A thin-film dryer is used to recover halosilanes and form a dry product, such as a flowable powder, from the slurry. The heavies also may be recovered from the slurry, or at least a portion of the heavies may be included in the product.

I. Definitions and Abbreviations

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, percentages, temperatures, times, and so forth, as used in the specification or claims are to be understood as being modified by the term "about." Accordingly, unless otherwise indicated, implicitly or explicitly, the numerical parameters and/or non-numerical properties set forth are approximations that may depend on the desired properties sought, limits of detection under standard test conditions/methods, limitations of the processing method, and/or the nature of the parameter or property.

Bubble point: With respect to a vapor-liquid equilibrium, the bubble point is the temperature at which a liquid mixture first begins to vaporize.

DCS: dichlorosilane ($SiH_2Cl_2$)

Dew point: With respect to a vapor-liquid equilibrium, the dew point is the temperature at which a gaseous mixture first begins to condense.

Fines: As used herein, the term "fines" refers to particles having an average diameter of 10-250 μm.

Heavies: As used herein, the term "heavies" includes reaction products that have a boiling or sublimation point greater than tetrahalosilane at standard temperature and pressure. In a process for making chlorosilanes, heavies are reaction products that have a boiling or sublimation point greater than 58° C. at STP (i.e., greater than the boiling point of tetrachlorosilane at STP). Heavies include metal halides (e.g., aluminum chlorides such as $AlCl_3$), polyhalosilanes and/or polyhalooxysilanes (e.g., $Si_2Cl_6$, $Si_2OCl_6$), and combinations thereof.

Mass flux: Mass flow rate per unit surface area; typically measured in units of kg $s^{-1}$ $m^{-2}$.

Slurry: A semi-liquid, flowable mixture of fine solids and a liquid.

STC: silicon tetrachloride or tetrachlorosilane

TCS: trichlorosilane ($SiHCl_3$)

VLE: vapor-liquid equilibrium

Volatile halosilanes: Tetrahalosilane, trihalosilane, dihalosilane, monohalosilane, and combinations thereof.

II. Overview of Representative Embodiments

Embodiments of a process for recovering inorganic halosilanes from reaction residues comprise (a) flowing an inorganic halosilane slurry comprising (i) volatile halosilanes, (ii) silicon particles, and (iii) heavies through a vaporization zone of a thin-film dryer to vaporize the volatile halosilanes, the vaporization zone having an internal pressure at or above atmospheric pressure and an internal temperature $T_1$ greater than an upper end of a boiling point range of the volatile halosilanes at the internal pressure of the vaporization zone; recovering vaporized volatile halosilanes from the vaporization zone; and recovering a solid residue comprising the silicon particles from an outlet of the thin-film dryer.

In any or all of the above embodiments, the slurry may initially comprise more than 50 wt % volatile halosilanes. In any or all of the above embodiments, the heavies may comprise metal halides, polyhalosilanes, polyhalooxysilanes, and combinations thereof. In some embodiments, the slurry initially comprises up to 50 wt % heavies. In any or all of the above embodiments, the solid residue may have a dryness of at least 70%.

In any or all of the above embodiments, the process may further comprise flowing the inorganic halosilane slurry at a rate to maintain a slurry mass flux from 0.001 kg $s^{-1}$ $m^{-2}$ to 0.1 kg $s^{-1}$ $m^{-2}$. In any or all of the above embodiments, the process may further comprise maintaining the internal pressure in the range of 101-170 kPa.

In any or all of the above embodiments, the thin-film dryer may include a rotor within the vaporization zone, the rotor having a plurality of blades extending toward an internal wall surface of the thin-film dryer, and the process may further comprise rotating the rotor to form a slurry film having an average thickness≤2 mm on the internal wall surface.

In any or all of the above embodiments, the process may further comprise treating the solid residue to produce a solid material that is non-reactive when exposed to ambient atmosphere. In some embodiments, treating the solid residue comprises contacting the solid residue with an alkaline hydrate. In any or all of the above embodiments, the vaporized volatile halosilanes recovered from the vaporization zone may further comprise entrained fines, and the process may further comprise separating the entrained fines from the volatile halosilanes.

In any or all of the above embodiments, the temperature $T_1$ may be less than an upper end of a boiling point or sublimation point range of the heavies at the internal pressure, and the solid residue further comprises at least a portion of the heavies. In some of these embodiments, vapor recovered from the vaporization zone is substantially devoid of heavies.

In any or all of the above embodiments, when the inorganic halosilane slurry is an inorganic chlorosilane slurry comprising (i) silicon tetrachloride, trichlorosilane, dichlorosilane, or any combination thereof, (ii) silicon particles, and (iii) heavies, the temperature $T_1$ may be from 80° C. to 200° C. In some embodiments, the temperature $T_1$ is maintained within the range of from 80° C. to 115° C. In such embodiments, the solid residue further may further at least a portion of the heavies.

In any or all of the above embodiments, the thin-film dryer may contain a second vaporization zone positioned between the vaporization zone and the outlet, and the process may further include maintaining an internal temperature $T_2$ in the second vaporization zone, where $T_2 > T_1$ and flowing the slurry sequentially through the first vaporization zone and the second vaporization zone. In some embodiments, the process further comprises maintaining the temperature $T_2$ at a temperature greater than a boiling point or sublimation point of at least one species of the heavies at the internal pressure, vaporizing at least a portion of the heavies in the second vaporization zone to produce a heavies vapor, and recovering the heavies vapor. In certain embodiments, the solid residue has a dryness of at least 70%. In some embodiments, the inorganic halosilane slurry is an inorganic chlorosilane slurry, and the process further comprises maintaining the temperature $T_1$ at 80° C. to 115° C. and the temperature $T_2$ at a temperature from greater than 115° C. to 200° C.

III. PROCESS FOR RECOVERING INORGANIC HALOSILANES FROM REACTION RESIDUES

A slurry obtained from the manufacture of inorganic halosilanes comprises solids and vaporizable halosilanes. The slurry may include volatile halosilanes, heavies (e.g., polyhalosilanes/polyhalooxysilanes such as $Si_2X_6$ or $Si_2OX_6$, and/or metal halides such as $AlX_3$), entrained metal particles, and/or silicon particles. In some commercial embodiments, a halosilane plant, such as a chlorosilane plant, produces up to 30 liters of slurry per minute. The slurry may include 50-95 wt % liquids, such as 60-92.5 wt % or 80-90 wt % liquids, and may include up to 50 wt % heavies, such as from 1-40 wt %, 1-30 wt % or 2-15 wt % heavies, or from 1-40 mol % heavies, 1-30 mol % heavies, or 1-20 mol % heavies. It is desirable to recover halo silanes from the slurry. In some instances, heavies also are recovered from the slurry. The heavies may be removed concurrently with the halosilanes and/or removed subsequent to halosilane removal.

In some embodiments, the slurry liquids are separated from the solids in a single pass using a thin-film dryer to produce a substantially dry solid residue. Other components that are vaporizable at the operating conditions of the thin-film dryer (e.g., $AlCl_3$) also may be separated from the solids. "Substantially dry" means that the product has a dryness of at least 70%, such as a dryness of at least 75%, at least 80%, or at least 85%. Conversely, "substantially dry" means that the solid residue contains 30 wt % or less recoverable halosilanes (i.e., volatile halosilanes), such as ≤25 wt %, ≤20 wt %, or ≤15 wt % recoverable halosilanes. Dryness is determined by weighing a sample of the solid residue, and then drying it to a constant weight, e.g., on a hot plate. Percent dryness is calculated by (final weight/initial weight)×100%. Percent dryness is based upon recoverable liquid (e.g., volatile halosilanes); the solid residue may include some entrapped liquid within the solid particles. The solid residue may range from paste-like to damp powder. Desirably, the solid residue is a flowable powder. The solid residue comprises silicon particles, and may further include metal particles (e.g., from the catalyst and/or halosilane processing equipment). Depending on the dryer conditions (e.g., temperature, residence time), the solid residue also may include heavies.

Suitable thin-film dryers are commercially available (e.g., Model No. CP-0500 (a 5-m$^2$ dryer), LCI Corporation, Charlotte, N.C.), and may be used with or without further modification. Thin-film dryers can have a vertical or horizontal orientation. FIG. 1 shows an exemplary vertical thin-film dryer 10. The thin-film dryer 10 includes a heated vessel 12 that defines a chamber 13, which includes at least one vaporization zone and a rotor 14 comprising one or more blades 16 within the chamber 13. The heated vessel 12 of FIG. 1 includes an inner wall 12a and an outer wall 12b surrounding the inner wall 12a and defining an annular space 12c between the inner and outer walls. The heated vessel 12 may be heated by any suitable means, such as by circulating a heated fluid within the space 12c. Suitable heated fluids include, but are not limited to, steam and oil. The size of the suitable film dryer may be determined, at least in part, by the plant capacity and/or the rate of slurry production. In some arrangements, the thin film dryer may have an interior wall surface area of 5-20 m$^2$, such as an interior wall surface area of 5-10 m$^2$.

The temperature within the chamber 13 may be controlled by adjusting the temperature of the heated fluid circulating within the space 12c. In some examples, two oil feeds of differing temperatures (e.g., ~90° C. and ~200° C.) may be mixed in varying proportions to provide a heating fluid with the desired temperature.

As a slurry feed 17 introduced into the dryer through inlet 18 flows through the dryer and the rotor 14 turns, a thin slurry film is formed on an interior surface of the inner wall 12a by action of the blades 16. When the dryer is oriented vertically, the inlet 18 is located in an upper portion of the dryer and the slurry feed flows downwardly through the dryer. A thin-film dryer can be operated in a continuous mode. Vapors 21, 23 can exit the thin-film dryer in a counter-current direction through an upper outlet 20 and/or in a co-current direction through a lower outlet 22. If desired, the vapors 21, 23 can be collected and condensed by any suitable means. A solid residue 24 comprising solids, including silicon particles, is recovered through the lower outlet 22.

In some embodiments, the blades 16 form a thin slurry film having an average thickness of <2 mm. This thin film creates a large surface area for heat transfer, thereby enabling the thin-film dryer to dry the slurry and form a solid product in a single pass. As a flowable solid residue 24 is formed, the blades 16 scrape the powder 24 from the inner wall 12a. In some examples, no further drying is achieved after the powder has been scraped from the wall.

The internal temperature of the thin-film dryer may be selected based at least in part on the slurry composition. The temperature may be adjusted, for example, to accommodate slurries of different heavies concentrations and/or to tailor the solid residue composition. Advantageously, the temperature is higher than the boiling point range of volatile halosilanes (e.g., tetrahalosilane, trihalosilane, and/or dihalosilane) in the slurry at the operating pressure in the chamber 13. It may be desirable to recover only the volatile halosilanes from the slurry and retain the heavies in the solid residue. If heavies are to be retained in the solid residue, the temperature is selected to be less than the boiling point of at least one of the heavies at the pressure within the thin-film dryer. In certain embodiments, the temperature is selected so that vapor recovered from the vaporization zone is substantially devoid of heavies. "Substantially devoid" means that the vapor comprises less than 5 wt % heavies, such as less than 2 wt % heavies or less than 1 wt % heavies.

In some examples, the slurry is a chlorosilane slurry and the temperature inside the chamber 13 of the thin-film dryer is maintained within a range of from 80° C. to 200° C. In one arrangement where the halosilanes are chlorosilanes, the temperature is from 80° C. to 115° C. (i.e., higher than the boiling point of STC at the operating pressure in the chamber 13 and lower than the upper end of the boiling/sublimation temperature range of the heavies), and the solid residue comprises at least a portion of the heavies. The solid residue may comprise substantially all of the heavies, e.g., at least 95% of the heavies, such as at least 98% of the heavies or at least 99% of the heavies. If a solid residue substantially devoid of heavies is desired, the temperature may be maintained at a temperature greater than the upper end of the boiling/sublimation temperature range of the heavies at the operating pressure in the chamber 13, e.g., greater than 115° C., such as from greater than 115° C. to 200° C.

In some embodiments, the chamber 13 of the heated vessel 12 comprises a first (e.g., upper) vaporization zone Z1 and a second (e.g., lower) vaporization zone Z2. In this arrangement, the annular space between the inner and outer walls of the dryer is configured, or divided, such that a first heated fluid at a first temperature can be circulated through the annular space corresponding to the first zone Z1 and a second heated fluid at a second temperature can be circulated through the annular space corresponding to the second zone Z2. The first temperature is less than or equal to the second temperature. In some arrangements, the first temperature is less than the second temperature so that volatile components (e.g., DCS, TCS and/or STC) may be evaporated in and recovered from the first vaporization zone of the dryer, and less volatile components (e.g., heavies such as polychlorosilanes) may be evaporated in and recovered from the second vaporization zone of the dryer. A portion of the heavies also may exit the dryer through the dryer's upper outlet. A two-temperature arrangement advantageously minimizes film boiling at the inlet of the dryer, which reduces drying efficiency, and facilitates selective recovery of the volatile species from the first vaporization zone Z1. In one embodiment, the slurry is a chlorosilane slurry, the first zone Z1 is maintained at an internal temperature $T_1$ from 80° C. to 115° C. and the second zone Z2 is maintained at an internal temperature $T_2$ from greater than 115° C. to 200° C. In some instances, if a flowable powder is produced in the first zone Z1, then no additional dryness is achieved in the second zone Z2.

The dryer may be operated at a pressure in the chamber 13 ranging from atmospheric pressure to a slight positive pressure, such as a pressure in the range of 101 kPa to 170 kPa, or from 105 kPa to 170 kPa. In some instances, the dryer is operated at atmospheric pressure, i.e., approximately 101 kPa.

A flow rate of the slurry within the dryer may be selected, based in part, on the slurry composition, the desired residue dryness, the interior wall surface area of the dryer, and/or the dryer conditions. The flow rate might be affected, for example, by the concentration of solids in the slurry, the concentration of heavies in the slurry, the internal temperature(s) of the dryer, the rotation speed of the rotor, the dryer's interior wall surface area, the thin film thickness, the desired residue dryness, or any combination thereof. Generally, a lower flow rate produces a drier solid residue, if other variables are kept constant. In one embodiment, the slurry has a mass flow rate per unit area (mass flux) of 0.001-0.1 kg $s^{-1}$ $m^{-2}$ (3.6-360 kg $h^{-1}$ $m^{-2}$ or 0.74-74 lb $h^{-1}$ $ft^{-2}$), such as a mass flux of 0.002-0.1 kg $s^{-1}$ $m^{-2}$, 0.002-0.07 kg $s^{-1}$ $m^{-2}$, 0.002-0.05 kg $s^{-1}$ $m^{-2}$, 0.005-0.05 kg $s^{-1}$ $m^{-2}$, 0.007-0.05 kg $s^{-1}$ $m^{-2}$, 0.01-0.05 kg $s^{-1}$ $m^{-2}$, 0.02-0.05 kg $s^{-1}$ $m^{-2}$, or 0.02-0.04 kg $s^{-1}$ $m^{-2}$.

Residence time (RT) can be determined from the volumetric flow rate, interior wall surface area, and film thickness:

RT=(interior wall surface area×film thickness)/flow rate(liters per minute)

Thus, a slurry flowing at a rate of 24 liters (24,000 cm³) per minute through a dryer which has an interior wall surface area of 10 m² (100,000 cm²) and produces a film having a thickness of 2 mm (0.2 cm) would have a residence time of 0.83 minutes or 50 seconds.

In some embodiments (e.g., with a dryer having an interior wall surface area of 10 m²), the disclosed method can produce 100-150 kg/hour solid residue at 80% dryness, resulting in 25-40 kg/hour liquid removal capacity.

The vapor recovered from the upper outlet of the thin-film dryer comprises volatile halosilanes. The recovered vapor also may include fines, which are solid particles entrained in the vapor stream. Advantageously, the fines are separated from the recovered vapor stream. Fines may be separated by passing the vapor stream into a condenser, and then flowing the condensed vapor and fines into a settler vessel, in which the entrained solids to settle out by gravity from the condensed vapor. In some embodiments, a portion of the condensed vapor is recirculated and combined with the vapor stream as it enters the condenser. The recirculated liquid facilitates condensation of the vapor and washes down the condenser walls to reduce fouling by the fines.

The solid residue recovered from the thin-film dryer typically includes metal halide solids remains reactive when exposed to ambient atmosphere. When exposed to ambient atmosphere, the solid residue may produce corrosive hydrogen halide gas and/or hydrohalide acid, and may be flammable. For example, when the halosilane slurry comprises chlorosilanes, the solid residue may include metal chlorides, which might produce hydrogen chloride gas and/or hydrochloric acid when exposed to ambient atmosphere. Accordingly, the solid residue may be further treated to render it non-reactive to the ambient atmosphere.

Suitable methods for treating the solid residue are described in the prior art, e.g., U.S. 2006/0183958A, which is incorporated herein by reference. In some embodiments, the solid residue is treated with an alkaline hydrate to yield a stable, neutral solid suitable for disposal or precious metal recovery. The solid residue may be treated with the alkaline hydrate at a temperature greater than 70° C. (e.g., at a temperature from 70-150° C., 70-100° C., 80-100° C., or 80-90° C.). Generally, sufficient alkaline hydrate is added to provide a pH≥7 in the treated solid residue. Examples of suitable alkaline hydrates that may be used in the process are sodium or potassium sesquicarbonate, sodium aluminum sulfate dodecahydrate, sodium acetate trihydrate, sodium ammonium phosphate tetrahydrate, sodium carbonate decahydrate, sodium citrate dehydrate, sodium dihydrogen phosphate dehydrate, and mixtures of calcium carbonate or sodium carbonate, sodium bicarbonate, and/or other basic salts. In addition, inert hydrated minerals may be used such as Aluminite, Apophyllite, Bloedite, Chabazite, Gaylus site, Gmelinite, Heulandite, Kainite, Kieserite, Laumonitite, Levyne, Mesolite, Mirabilite, Montmorillonite, Mordenite, Natrolite, Newberyite, Phillipsite, Scolecite, Stilbite, Struvite, and damp soil. In the case of damp soil, excess water content can cause processing difficulties; a water content of about 5% (w/w) is suitable for most purposes. Soil may be mixed with lime (calcium carbonate), trona (a natural mineral comprising sodium carbonate, sodium bicarbonate, and water) or other alkaline solid to provide sufficient neutralizing strength. In order to satisfy the requirements for non-hazardous land fill disposal, the basic anion(s) is/are generally limited to sodium, potassium, calcium, and magnesium and excludes lithium, rubidium, barium, strontium, and the like.

In one exemplary process, the solid residue is mixed with water to form a slurry. Sufficient aqueous calcium carbonate is added to the slurry to neutralize the slurry and provide a pH≥7. The slurry is then centrifuged, and the recovered solids (primarily calcium chloride) are collected and discarded or, in some instances, further treated for precious metal recovery.

Other methods of treating solid residues generated during production of halosilanes are described in patent publications, e.g., in U.S. Pat. No. 5,182,095, U.S. Pat. No. 5,246,682, U.S. Pat. No. 8,119,086, and DE 4116925A1.

IV. Examples

Slurries were dried in a pilot-scale thin-film dryer having a 3 ft² (0.28 m²) heating surface. The thin-film dryer was heated with hot oil having a temperature of 390° F. (199° C.). The rotor had a variable speed control, typically held at a speed of 600-1000 rpm. The rotor included a feed distribution ring, pendulum swing blades, and a bottom stub shaft. Slurry entered the unit tangentially above the heated zone and was distributed evenly over the inner circumference of the body wall by the rotor. After entering the dryer, the slurry flowed down the heated inner walls while being constantly agitated by the rotor blades. At some point in the dryer, the solids began to separate and were scraped off the wall by the "zero clearance" rotor blades. Powder formed, exited the bottom of the dryer, and fell into a portable receiver, which was emptied periodically. Vapors flowed counter-currently to the slurry and exited the top of the dryer to a receiver.

To prevent film boiling on the heating surface, the slurry was introduced into the dryer for 1-2 minutes before starting the hot oil flow. The slurry flow rate into the dryer was controlled by adjusting a flow meter valve. Due to high variability of the flow rate (i.e., from solid settling in the feed line), the flow meter was set to manual, and the valve position was adjusted to maintain the desired flow rate.

In initial runs, the slurry feed rate was 150-250 lb/hr (68-113 kg/hr). The results demonstrated complete recovery of STC and TCS with experimental vapor temperatures as high as 236° F./113° C. (boiling point of STC=135° F./57° C., boiling point of TCS=89° F./32° C.), and powder temperature as high as 275° F./135° C. The solid residue ranged from paste-like to a damp powder.

Additional runs were performed with varying feed rates and slurry compositions. Slurry, powder, and vapor samples were collected from each run after reaching steady state. The liquid and vapor compositions of the slurry were determined by gas chromatography. The solid content of the slurry was determined by drying a known amount of slurry sample in a small aluminum boat over a hot plate. The weight of the solid residue was determined after drying and used to calculate the percentage of solids in the slurry.

$S\% = $(final weight of dried slurry/initial weight of slurry)$\times 100\%$

Dryness was determined by weighing a sample of the solid residue, and then drying it to a constant weight, e.g., on a hot plate.

% dryness=(final weight of dried residue/initial weight of residue)$\times 100\%$ The percentage of volatile silane (e.g., STC, TCS, and/or DCS) recovery was calculated as follows:

$W_S = S\% \times F$ $W_{LS} = (100\% - \%\text{ dryness}) \times W_S$

% Recovery=$(((F-W_S)-W_{LS})/(F-W_S)) \times 100\%$ where $W_S$=weight of solid in feed (kg/hr), $W_{LS}$=weight of liquid remaining in dried powder (kg/hr); F=feed rate (kg/hr), and S=solid weight percent.

Overall, the slurry included 60 wt % volatiles (STC and TCS) and 40 wt % heavies ($Si_2Cl_6$ and $Si_2OCl_6$). The boiling points of these heavies range from 135-145° C. The slurry typically included 20-36 wt % solids. At 25° C., the density of the slurry ranged from 1665-1810 kg/m$^3$ (104-113 lb/ft$^3$), depending on the solid content. Compositions of representative slurry liquids are shown in Table 1.

TABLE 1

| | Runs: | | |
|---|---|---|---|
| | 1-2 | 5-6 | 7-9 |
| DCS (wt %) | 0.2 | 0.23 | 0.23 |
| TCS (wt %) | 10.5 | 11.74 | 11.34 |
| STC (wt %) | 47.8 | 46.96 | 45.43 |
| $Si_2OCl_6$ (wt %) | 6.4 | 6.48 | 6.79 |
| $Si_2Cl_6$ (wt %) | 32.18 | 34.15 | 35.66 |

A summary of the trial results is shown below in Table 2. Eleven data sets were collected from five runs. It was determined that a minimum feed rate of approximately 135 kg/hr was necessary to maintain a consistent flow in the feed line without plugging. At 136 kg/hr, the volumetric flow rate of the slurry was 1.44 L/min, which equates to a slurry velocity of roughly 0.05 m/s in a 25.4 mm inner diameter pipe. Lower feed rates were correlated with greater dryness, and produced a flowable powder with low content of volatile halosilanes. Where the feed rate is a range, the high end of the range was used to calculate the percent liquid recovery per unit hour.

TABLE 2

| Run | Feed Rate (kg/hr) | Rotor rpm | Feed Solid wt % | % Dryness | % Liquid Recovery |
|---|---|---|---|---|---|
| 1 | 408 | 600 | 21 | 46 | 86 |
| 2 | 340 | 600 | 21 | 63 | 90 |
| 3 | 308 | 800 | 30 | 70 | 87 |
| 4 | 136 | 800 | 30 | 76 | 90 |
| 5 | 68-91 | 800 | 36 | 76 | 87 |
| 6 | 136-159 | 800 | 36 | 76 | 87 |
| 7 | 0-45 | 1000 | 30 | 84 | 93 |
| 8 | 113 | 1000 | 30 | 76 | 90 |
| 9 | 23-181 | 1000 | 30 | 68 | 86 |
| 10 | 143 | 200 | 19 | 76 | 94 |
| 11 | 143 | 800 | 19 | 76 | 94 |

From the results in Table 2, it can be seen that on average, the dried residue samples obtained at a feed rate of approximately 135 kg/hr had a dryness of 76%, and the liquid recovery percentage ranged from 87-94%. The dryness was independent of the percentage of solid in the slurry and the rotor speed. When the residues become flowable powders, they are scraped off the heated wall by the rotor blades, and no further dryness is achieved. When the slurry included 19 wt % solid, up to 94% of the liquid (i.e., volatile halosilanes) was recovered. When the solid percentage doubled, the liquid recovery was reduced to 87%. Although residue dryness was independent of the slurry solid content, an increase in the solid fraction caused more liquid entrapment in the solids and reduced the amount of liquid recovered. The rotor speed did not have a significant effect on the percentage of liquid evaporation.

Figure 2:
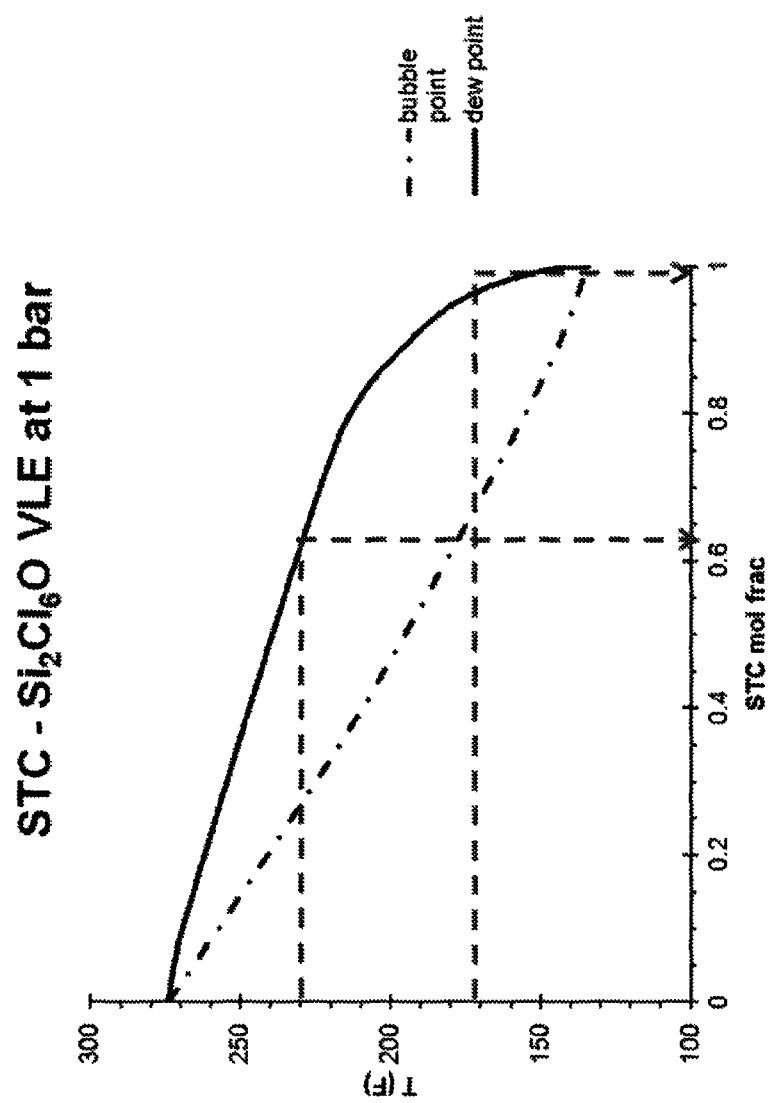
FIG. 2 is a graph showing the vapor-liquid equilibrium of $SiCl_4$—$Si_2Cl_6O$ at a pressure of 1 bar (100 kPa).

FIG. 2 is a graph illustrating the predicted vapor liquid equilibrium (VLE) of STC and $Si_2Cl_6O$ at 1 bar. The upper curve (solid line) on the graph represents the dew point, and the lower curve (dash-dot-dash line) represents the bubble point. These predicted measurements assumed that the temperature probe is located 7 feet (2.1 m) away from the dryer as measured from the upper vapor outlet.

The liquid portion of the slurry from runs 5 and 6 contained 0.23 wt % DCS, 11.74 wt % TCS, 46.96 wt % STC, 6.48 wt % $Si_2OCl_6$, and 34.15 wt % $Si_2Cl_6$. This liquid composition was consistent with the vapor temperature profile predicted for runs 5 and 6.

In view of the many possible embodiments to which the principles of the disclosed invention may be applied, it should be recognized that the illustrated embodiments are only examples and should not be taken as limiting the scope of the invention. Rather, the scope of the invention is defined by the following claims.

We claim:
1. A process for recovering inorganic halosilanes from reaction residues, comprising:
flowing an inorganic halosilane slurry comprising (i) volatile halosilanes, (ii) silicon particles, and (iii) heavies through a vaporization zone of a thin-film dryer to vaporize the volatile halosilanes, the vaporization zone having an internal pressure at or above atmospheric pressure and an internal temperature $T_1$ greater than an upper end of a boiling point range of the volatile halosilanes at the internal pressure of the vaporization zone;

recovering vaporized volatile halosilanes from the vaporization zone; and recovering a solid residue comprising the silicon particles from an outlet of the thin-film dryer.

2. The process of claim 1 wherein the slurry initially comprises more than 50 wt % volatile halosilanes.

3. The process of claim 1, wherein the heavies comprise metal halides, polyhalosilanes, polyhalooxysilanes, and combinations thereof.

4. The process of claim 1 wherein the slurry initially comprises up to 50 wt % heavies.

5. The process of claim 1 wherein the solid residue has a dryness of at least 70%.

6. The process of claim 1, further comprising flowing the inorganic halosilane slurry at a rate to maintain a slurry mass flux from 0.001 kg s$^{-1}$ m$^{-2}$ to 0.1 kg s$^{-1}$ m$^{-2}$.

7. The process of claim 1, further comprising maintaining the internal pressure in the range of 101-170 kPa.

8. The process of claim 1 wherein:

the thin-film dryer comprises a rotor within the vaporization zone, the rotor having a plurality of blades extending toward an internal wall surface of the thin-film dryer; and the process further comprises rotating the rotor to form a slurry film having an average thickness≤2 mm on the internal wall surface.

9. The process of claim 1, further comprising treating the solid residue to produce a solid material that is non-reactive when exposed to ambient atmosphere.

10. The process of claim 9 wherein the treating the solid residue comprises contacting the solid residue with an alkaline hydrate.

11. The process of claim 1 wherein the vaporized volatile halosilanes recovered from the vaporization zone further comprise entrained fines, the process further comprising separating the entrained fines from the volatile halosilanes.

12. The process of claim 1 wherein:

the temperature $T_1$ is less than an upper end of a boiling point or sublimation point range of the heavies at the internal pressure; and the solid residue further comprises at least a portion of the heavies.

13. The process of claim 12 wherein vapor recovered from the vaporization zone is substantially devoid of heavies.

14. The process of claim 1 wherein:

the inorganic halosilane slurry is an inorganic chlorosilane slurry comprising (i) silicon tetrachloride, trichlorosilane, dichlorosilane, or any combination thereof, (ii) silicon particles, and (iii) heavies; and the temperature $T_1$ is from 80° C. to 200° C.

15. The process of claim 14, further comprising maintaining the temperature $T_1$ at 80° C. to 115° C.

16. The process of claim 15 wherein the solid residue further comprises at least a portion of the heavies.

17. The process of claim 1 wherein the thin-film dryer contains a second vaporization zone positioned between the vaporization zone and the outlet, the process further comprising:

maintaining an internal temperature $T_2$ in the second vaporization zone, where $T_2 > T_1$; and flowing the slurry sequentially through the first vaporization zone and the second vaporization zone.

18. The process of claim 17, further comprising:

maintaining the temperature $T_2$ at a temperature greater than a boiling point or sublimation point of at least one species of the heavies at the internal pressure, the at least one species of the heavies comprising at least one polyhalosilane or polyhalooxysilane;

vaporizing at least a portion of the heavies in the second vaporization zone to produce a heavies vapor; and recovering the heavies vapor.

19. The process of claim 18 wherein the solid residue has a dryness of at least 70%.

20. The process of claim 17 wherein the inorganic halosilane slurry is an inorganic chlorosilane slurry, the process further comprising maintaining the temperature $T_1$ at 80° C. to 115° C. and the temperature $T_2$ at a temperature from greater than 115° C. to 200° C.

* * * * *